United States Patent [19]
Rijckaert et al.

[11] 4,392,163
[45] Jul. 5, 1983

[54] MAGNETIC TAPE RECORDING AND/OR REPRODUCING APPARATUS WITH AUTOMATIC HEAD POSITIONING

[75] Inventors: Albert M. A. Rijckaert; Edmond de Niet; Jacobus P. Beun, all of Eindhoven, Netherlands

[73] Assignee: U.S. Philips Corporation, New York, N.Y.

[21] Appl. No.: 187,656

[22] Filed: Sep. 16, 1980

[30] Foreign Application Priority Data

Sep. 28, 1979 [NL] Netherlands ................ 7907219

[51] Int. Cl.³ .................. G11B 5/43; G11B 21/10
[52] U.S. Cl. ............................. 360/76; 360/77; 360/109
[58] Field of Search ................ 360/77, 76, 109

[56] References Cited

U.S. PATENT DOCUMENTS 3,526,726  9/1970  Corbett et al. .................. 360/76
4,176,381  11/1979 de Niet et al. .................. 360/77
4,258,398  3/1981  Bixby et al. ..................... 360/76

FOREIGN PATENT DOCUMENTS 1309568  12/1961  France.

Primary Examiner—Robert S. Tupper
Attorney, Agent, or Firm—David R. Treacy

[57] ABSTRACT

A magnetic tape recorder or playback apparatus, especially suitable for tape having a large number of parallel longitudinal tracks, has a positioning device for independently correcting tracking and skew errors. A first positioning system uses two piezo-electric elements parallel to each other and equally spaced on opposite sides of the pivot axis, and a second positioning system arranged between the first two piezo-electric elements, having at least three piezo-electric elements regularly spaced around and extending longitudinally about the pivot axis.

9 Claims, 4 Drawing Figures

MAGNETIC TAPE RECORDING AND/OR REPRODUCING APPARATUS WITH AUTOMATIC HEAD POSITIONING

BACKGROUND OF THE INVENTION

The invention relates to an apparatus for recording and/or reproducing signals in a plurality of parallel longitudinal tracks on a magnetic tape. Such apparatus includes a head support which carries a magnetic head having a head face across which the magnetic tape is moved during operation and having air gaps, which terminate in a scanning portion of the head face, for scanning the respective tracks on the magnetic tape. The position of the magnetic head relative to the magnetic tape is adjustable by means of a positioning device which comprises first and second positioning systems which comprise piezo-electric elements, by which first positioning system the magnetic head is movable in a first direction relative to the magnetic tape and by which second positioning system the magnetic head is pivotable in a second direction relative to the magnetic tape by pivoting about a pivotal axis which extends substantially perpendicularly to a plane tangential to the scanning portion of the head face. The positioning systems are controlled by first and second control means respectively for generating and applying a control signal to the piezo-electric elements of the respective positioning systems, which control signal is representative of the difference between the instantaneous and the desired position of the magnetic head relative to the magnetic tape.

In order to increase the number of tracks and thus the useful effect of the signal storage on the magnetic tape, the track widths and the track spacings are continually being reduced. As an example, equipment has been developed with which the signal storage on the magnetic tape is effected in more than 100 tracks having a track width of approximately 40 micrometers, and a track spacing of approximately 10 micrometers. It is obvious that in this type of equipment slight displacements of the magnetic tape relative to the magnetic head in the width direction of the tape are sufficient to prevent the respective air-gaps of the magnetic head from following the associated tracks with the desired accuracy. Thus, the accuracy with which a magnetic head can be positioned is a factor which also determines the minimum attainable width of the track and the track-to-track spacing.

In such apparatus it is further essential for satisfactory reproduction that the respective air gaps of the magnetic head as they follow the tracks are continuously so positioned relative to the track that the time relationship between the respective tracks is maintained constant within narrow limits. This time relationship may then be disturbed by tilting of the magnetic tape relative to the magnetic head (so-called "skew").

In order to comply with the stringent position requirements, apparatus of this type are provided with positioning devices which control the position of the magnetic head relative to the magnetic tape. Such an apparatus is for example known from British Patent Specification No. 925,603. The positioning device of this known apparatus comprises two positioning systems, of which a first positioning system is adapted to correct an irregular speed of transport relative to the magnetic head (so-called "wow-and-flutter"). This correction is effected by pivoting the magnetic head around a pivotal axis which is directed perpendicularly to the longitudinal axis of the magnetic tape. In the way the first positioning system is not capable of correcting for displacements of the magnetic tape in the width direction of the tape. A second positioning system has been provided for maintaining an optimum time relationship between the respective tracks, which second positioning system comprises only one piezo-electric element, which extends parallel to a plane which is perpendicular to the direction of transport of the magnetic tape. Because of this arrangement of the piezo-electric element, this positioning system is sensitive to frictional forces as a result of the friction between the magnetic tape and the magnetic head. These frictional forces unfavorably load the positioning system, so that the desired accurate positioning in order to maintain the time relationship between the tracks cannot be attained under all circumstances. The method of arranging the magnetic head on the piezo-electric element of the second positioning system furthermore may permit to damage of the piezo-electric element as a result of, for example, an impact load which occurs in the case of irregular tape transport. Owing to these unsatisfactory positioning facilities the known apparatus is not suitable for following tracks with a small track spacing.

SUMMARY OF THE INVENTION

It is an object of the invention to render an apparatus of the type mentioned in the preamble suitable for accurately following a plurality of tracks situated on a magnetic tape with a small track-to-track spacing. According to the invention the magnetic head is arranged on two piezo-electric elements of the first positioning system, which elements are situated substantially parallel to each other and to the pivotal axis and are arranged on opposite sides of the pivotal axis, by means of which piezo-electric elements the magnetic head is movable in the width direction of the magnetic tape. This first positioning system is connected to the head support through the second positioning system, which comprises at least three piezo-electric elements, which are regularly spaced around the pivotal axis and are arranged with their longitudinal axes extending substantially parallel to said axis.

In this way an apparatus is obtained whose two positioning systems of the positioning device ensure that during reproduction the respective air gaps of the magnetic head very accurately follow the associated tracks both in the width direction of the magnetic tape and in respect of the time relationship between the various tracks. Therefore, the apparatus in accordance with the invention enables correct playback of magnetic tapes on which signals have been recorded in narrow tracks with a small track-to-track spacing.

Furthermore, by providing the two positioning systems with two and at least three piezo-electric elements respectively, a positioning device is obtained which is also capable of withstanding impact loads. The arrangement of the piezo-electric elements ensures that friction between the magnetic tape and the magnetic head cannot adversely affect the operation of the piezo-electric elements.

In this respect it is advantageous if the second positioning system comprises at least two pairs of piezo-electric elements, the two elements of each pair of piezo-electric elements being situated diametrically opposite one another relative to the pivotal axis.

This provides a very reliable second positioning system, which can withstand comparatively great forces.

In this respect it is also advantageous if the second positioning system comprises two spaced supports on which the respective ends of the piezo-electric elements of the second positioning system are disposed, of which supports a first support is connected to the first positioning system and a second support to the head support. This ensures that a satisfactory coupling is obtained between the first positioning system and the head support, without an individual piezo-electric element of the second positioning system being subjected to an excessive load.

A compact and satisfactory performing embodiment is obtained if the first positioning system comprises a supporting element which interconnects those ends of the piezo-electric elements of the first positioning system which are remote from the magnetic head, which supporting element together with the pizeo-electric elements of the first positioning system and the magnetic head constitutes a housing which accommodates the second positioning system.

In this embodiment it is advantageous that, if within the housing, the piezo-electric elements of the second positioning system extend from the first support in the direction of the magnetic head, and the second support is rigidly connected to an arm of the head support which extends into the housing.

Thus it is possible to connect the positioning device to the head support in a reliable and compact manner.

For this connection between the head support and the positioning device it is further preferred that the arm is constituted by a tube which is concentric with the pivotal axis, around which tube the piezo-electric elements of the second positioning system are disposed inside the housing.

In a further preferred embodiment in accordance with the invention the first control means comprises an optical measuring arrangement having two optical systems for sensing the respective edges of the magnetic tape, which systems are situated diametrically opposite one another relative to the pivotal axis. Because of the diametrically opposed arrangement of the two optical systems the control means associated with the first positioning system are not activated if pivoting is effected as a result of the operation of the second positioning system. Thus, the operation of the second positioning system does not influence the operation of the first positioning system.

The invention will be described in more detail with reference to the figures in the drawings which are given by way of non-limitative example.

DESCRIPTION OF THE PREFERRED EMBODIMENTS

Figure 1:
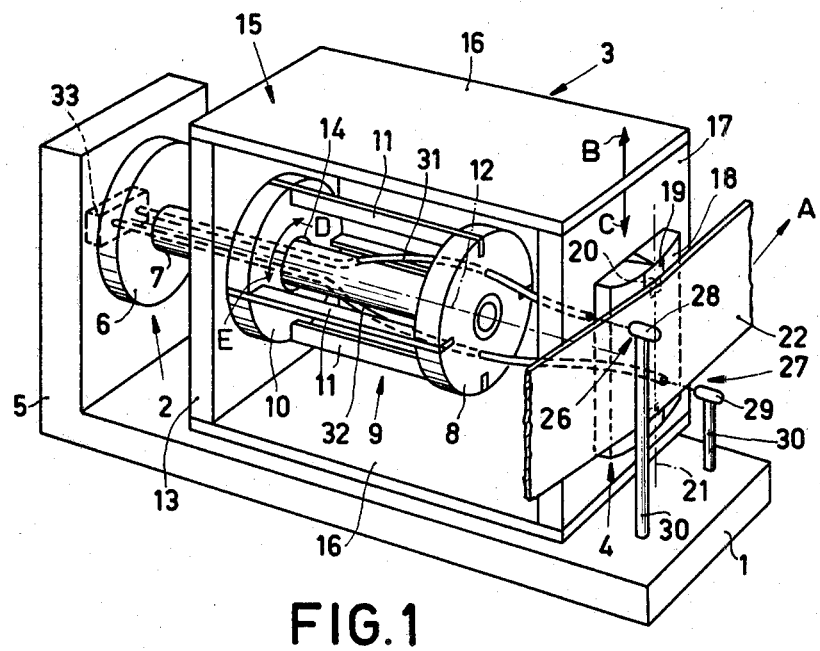
FIG. 1 is a perspective view of a part of an apparatus in accordance with the invention.

The apparatus shown in perspective in FIG. 1 comprises a desk plate 1 carrying a head support 2 which supports a magnetic head 4 via a positioning device 3.

The head support 2 comprises a portion 5 which is arranged substantially perpendicularly to the deck plate 1. On a side of the portion 5 that faces the magnetic head 4 a cylindrical flange 6 is mounted. The flange 6 is coaxial with an arm which is rigidly connected thereto and which is constituted by a tube 7 which extends in the direction of the magnetic head 4. At the end which faces the magnetic head 4 the tube 7 is rigidly connected to a flange-like annular support 8, which concentrically surrounds the tube and has a cylindrical periphery. The support 8 forms parts of a positioning system 9, which in addition to the support 8 comprises a further annular support 10 which is spaced from the support 8 and which is concentric with and entirely clear of the tube 7. The two supports 10 and 8 respectively constitute a first and a second support on which the respective ends of a number of piezo-electric elements 11, which form part of the positioning system 9, are rigidly mounted. The piezo-electric elements 11 each comprise a rectangular strip of a piezo-electric material and are regularly spaced around and extend substantially parallel to the axis 12 of the tube 7, the piezo-electric elements being so situated relative to the axis 12 that the width direction of each element extends radially with respect to this axis. In the embodiment of FIG. 1 the piezo-electric elements of the positioning system 9 are arranged in pairs with the two elements of each pair disposed diametrically opposite one another relative to the axis 12, two pairs of piezo-electric elements being provided in total.

The first support 10 is secured to that side of a rectangular plate supporting element 13 which faces the magnetic head 4 and is substantially perpendicular to the axis 12. The supporting element 13 is formed with a central bore 14, through which the tube 7 extends from the support 8 to the flange 6. The supporting element 13 forms part of a first positioning system 15, which in conjunction with the other or second positioning system 9 constitutes the positioning device 3. In addition to the supporting element 13 the first positioning system 15 comprises two rectangular piezo-electric elements 16, arranged on opposite sides of the axis 12 at substantially equal distances therefrom and in substantially parallel planes with their longitudinal axes extending substantially parallel to the axis 12, so that in the directions of their width the elements 16 extend substantially tangentially of a circle concentric with the axis 12. The piezo-electric elements 16 extend from the supporting element 13 in the longitudinal direction towards the magnetic head 4 and are rigidly connected to a housing or base 17 of the magnetic head 4 at first ends which are remote from the supporting elements 13 where the second ends of the elements 16 are rigidly connected. Thus the base 17, supporting element 13 and piezo-electric elements 16 form a housing within which the second positioning system 9 is arranged.

On the side which is remote from the head support the magnetic head 4 has a head face 18 which is provided with a scanning portion 19. In the scanning portion 19 a plurality of head or air-gaps 20 terminate, which gaps are defined by polepieces, not shown, associated with a corresponding number of channels of the magnetic head 4. The head gaps 20 are arranged in line, as respresented by an axis 21 in FIGS. 1 and 2. During operation a magnetic tape 22 passes across the head face 18 in a direction indicated by the arrow A in FIG. 1. In the present embodiment approximately 100 head gaps are provided in the manner described, the heads having a pitch (the so-called "track pitch") of 50 micrometers, made up of a track width of approximately 40 micrometers and a track spacing of approximately 10 micrometers. It is to be noted that depending on the function of the apparatus the magnetic head may comprise more or fewer head gaps. In this way the magnetic head may be formed up to 200 head gaps.

For correct operation it is important that during the reproduction of magnetic signals recorded on the magnetic tape 22 in a number of parallel longitudinal tracks 23 the head gaps 20 are correctly positioned relative to the tracks 23. In a manner to be discussed hereinafter the positioning systems 9 and 15 act as a pivoting and tracking system respectively and ensure that in the event of a deviation between the instantaneous and the desired position of the magnetic head relative to the magnetic tape the magnetic head is moved to the desired position.

1. The first positioning system 15

Figure 2:
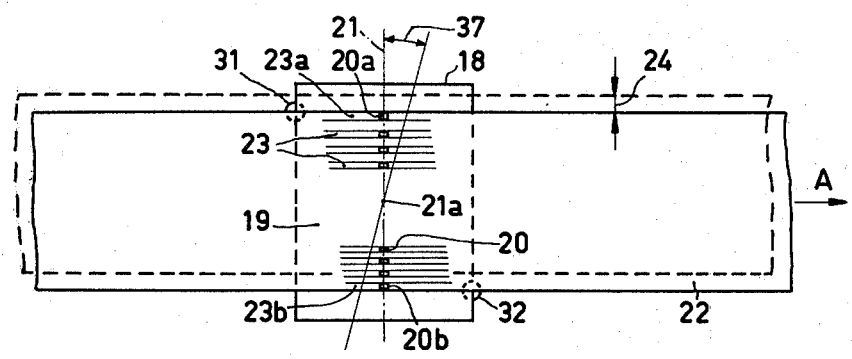
FIG. 2 is a schematic view of a tape and magnetic head illustrating the operation of the positioning device of the apparatus in accordance with the invention.

As is shown in FIG. 2, a relative shift of the magnetic tape in the width direction, i.e. transversely of the direction of transport A, may give rise to a deviation 24 in the distance between the upper side of the scanning portion 19 of the head face 18 and the associated edge of the magnetic tape. This deviation is the so-called "tracking error". Because of the arrangement of the piezo-electric elements 16 of the first positioning system 15, namely with their width directions substantially parallel to the direction of transport A and their longitudinal directions substantially parallel to the axis 12; the ability of the piezo-electric elements 16 to bend in accordance with an S-curve; and also the rigid connection of the ends of the elements 16 to the supporting element 13 and the housing 17 respectively, the piezo-electric elements 16 are capable of moving the magnetic head in directions parallel to the axis 21 of the row of head gaps 20 and to the width direction of the magnetic tape, as indicated by the arrows B and C respectively in FIG. 1. This movement continues until the magnetic head, viewed in the width direction of the tape, has resumed a correct position, in which position the respective head gaps again accurately follow the tracks 23 and the tracking error 24 has been corrected. For the detection of such a deviation, represented by the distance 24, and for controlling the first positioning system 15, a first control means 25, includes an optical measuring arrangement provided with two optical systems 26 and 27 respectively. For a more detailed description of such control means reference is made to the Netherlands Patent Application No. 77 12 418 to which U.S. Pat. No. 4,176,381 corresponds.

Relative to the direction of transport A the optical systems 26 and 27 are arranged with their active parts for detecting the magnetic tape situated upstream and downstream of the scanning portion 19. The active parts are arranged so that in a neutral position of the magnetic head 4 relative to the magnetic tape 22, i.e. that position of the magnetic head in which, in a non-energized rest position of the positioning device 3, the head gaps 20 accurately coincide with the corresponding tracks 23, the optical system 26 just senses the upper edge and the optical system 27 just senses the lower edge of the magnetic tape. Moreover, the optical systems 26 and 27 are disposed diametrically opposite one another relative to the axis 12, which in the neutral position of the magnetic head 4 intersects the axis 21 of the row of head gaps 20 at a point 21a, which is disposed centrally in the scanning portion 19. On that side of the magnetic tape 22 which does not face the magnetic head 4 the system 26 is constituted by a light-emitting element 28 and the system 27 by a light-emitting element 29. The elements 28 and 29 may, for example, comprise light-emitting diodes (LED's), which as shown in FIG. 1 are each arranged on a support 30, which is rigidly connected to the deck plate 1. The systems 26 and 27 furthermore comprise light-receiving elements 31 and 32, which in the present embodiment are constituted by light conductors in the form of optical fibres. These light conductors 31 and 32 pass through the base 17 and preferably terminate near the respective edge of the head face 18, opposite the associated light-emitting element 28 or 29.

Figure 3:
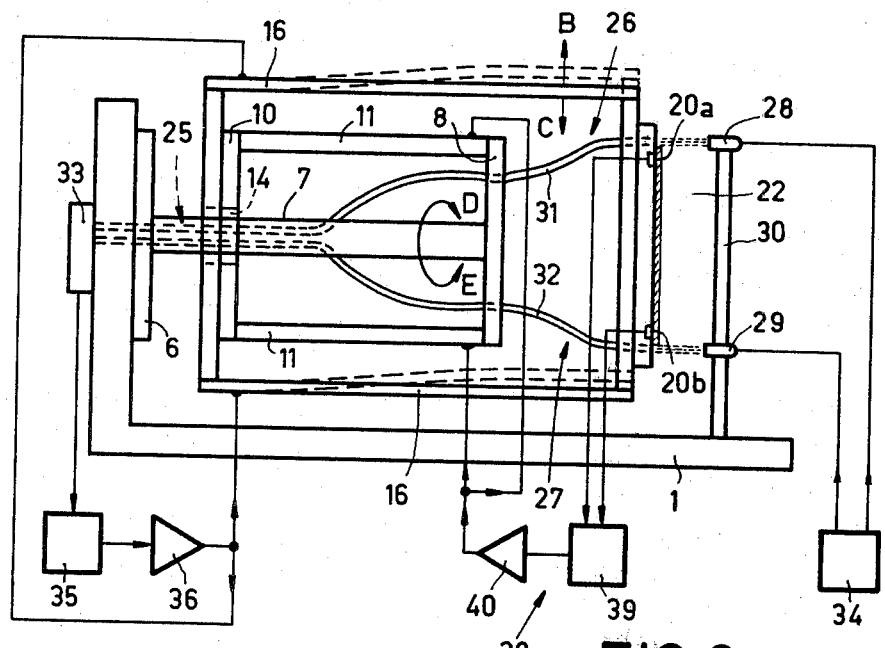
FIG. 3 is a combined side view of the various parts of the apparatus and an electrical block diagram in accordance with the invention.

The light conductors 31 and 32 extend from the base 17, in the direction of the portion 5 of the head support and pass through openings in the support 8. Between the supports 8 and 10 the light conductors 31 and 32 pass into the tube 7 through openings in the wall of the tube 7 and then pass through the tube 7 to the side of the portion 5 of the head support which is remote from the magnetic head 4. At this location the two light conductors are coupled to a common photodiode 33, whose output signal consequently represents the sum of the amounts of light received by the two optical conductors. The light-emitting diodes 28 and 29, as is schematically represented in FIG. 3, are each energized by a power-supply source 34, the diodes 28 and 29 being driven in phase opposition.

The beams emitted by the light-emitting elements 28 and 29 to the respective light-receiving elements 31 and 32 are received by the photodiode 33. If the magnetic tape 22 is in a correct neutral position relative to the magnetic head 4, i.e. if the scanning portion of the magnetic head 4 exactly coincides with the magnetic tape 22, the two light conductors 31 and 32 receive substantially equal amounts of light at practically any instant, which means that the output signal of the photodiode 33 is then constant and the first control means 25 are inoperative. If the magnetic tape has shifted in the width direction relative to the neutral position, the photodiode 33 will supply a deviating output signal whose amplitude is a measure of the positional error between the magnetic head and the magnetic tape and whose phase represents the direction of the positional error, which signal by means of a phase detector 35 and a servo-amplifier 36 belonging to the first control means 25 is converted into a control signal which is applied to the piezo-electric elements 16. If such a control signal is applied to the elements 16 these elements will bend in accordance with an S-curve. This bending, in the direction B or C in FIG. 1, results in the head being brought from the instantaneous position into the desired position relative to the magnetic tape. In this way it is ensured that in the event of relative movements in the width direction of the tape in spite of the large number of head gaps, the head gaps are rapidly restored to the correct position relative to the associated tracks, so that the tracks are accurately followed.

2. The second positioning system 9

In addition to the described positioning of the magnetic head 4 relative to the magnetic tape 22 in the width direction of the magnetic tape, it is also of importance that during the reproduction of the signals in the respective tracks 23 the time relationship between the various tracks is maintained within narrow limits. This phase or time relationship may be disturbed by a tilting of the magnetic tape relative to the magnetic head (so-called "skew"). In order to enable this skew, represented by the angle 37 in FIG. 2, to be measured, identical signals have been recorded on the magnetic tape in two reference tracks 23a and 23b, respectively situated at the upper and the lower edge of the tape in FIG. 2, during recording. During reproduction the reference tracks pass across head gaps 20a and 20b of the magnetic head, the output signals being applied to second control means 38, which comprise a phase detector 39 and a servo-amplifier 40 (see FIG. 3). As is schematically shown in FIG. 3, a control signal is available on the output of the phase detector 39, which signal is a measure of the phase or time difference between the tracks 23a and 23b, and which via the servo-amplifier 40 is applied to the piezo-electric elements 11 of the second positioning system 9 (see FIG. 1). As a result of this the piezo-electric elements 11 bend in accordance with an S-curve, i.e. in such a way that the support 10, and thus the first positioning system 15 and the magnetic head 4, are pivoted about a pivotal axis constituted by the axis 12 in a direction represented by the arrow D or E in FIG. 1, depending on the direction of tilting of the magnetic tape.

In this way the deviating time relationship between the parallel tracks 23 is corrected. In the case of pivoting about the pivotal axis 12 it is important that the pivotal axis intersects the scanning portion 19 of the magnetic head 4 substantially at the centre thereof. In this way it is avoided that the pivotal movement for eliminating a deviating time relationship results in an undesired tracking error and thus affects the operation of the first servo-system. As a result of such an arrangement the diametrically opposed optical systems 26 and 27 will measure changing amounts of light in the case of pivoting about the pivoting axis 12 but the ratio between the amounts of light measured by the systems 26 and 27 will remain constant, so that the first control means 25 will not supply an erroneous control signal to the piezo-electric elements 16.

The construction and the arrangement of the two positioning systems 9 and 15 relative to each other in one combined positioning device 3 thus ensures that in the case of reproduction of a signal in a large number of tracks on a magnetic tape the two positioning systems 9 and 15 described can operate without interaction between the two positioning systems. The apparatus described is of the type in which a large number of parallel longitudinal tracks can be scanned, such as in video equipment, in instrumentation equipment and in equipment for digital audio information. Although in the foregoing the operation of such an apparatus has been described for the reproduction of recorded magnetic signals, it is emphasized that the apparatus may equally be used for recording signals on a magnetic tape. For a satisfactory operation of the apparatus the first positioning system 15 with the associated first control means 25 should then also be operative during recording.

Figure 4:
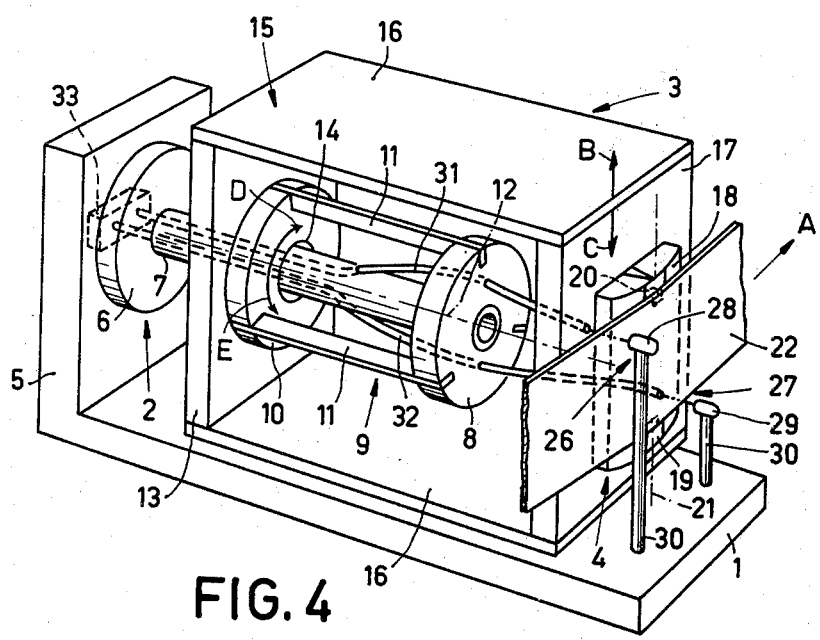
FIG. 4 is a perspective view of a part of a second embodiment of an apparatus in accordance with the invention.

It is alternatively possible to employ different numbers of piezo-electric elements for the positioning system 9. For example, in the embodiment shown in FIG. 4 a satisfactory result is obtained using three piezo-electric elements which are regularly spaced around the axis 12. However, it is also possible to employ more than four piezo-electric elements; for example four pairs of elements could be used with the two elements of each pair arranged diametrically opposite one another relative to the axis 12.

What is claimed is:

1. An apparatus for recording and/or reproducing signals in a plurality of parallel longitudinal tracks on a magnetic tape, comprising:
    a head support,
    a magnetic head having a head face adapted to allow movement of a magnetic tape thereacross during operation, and air gaps which terminate in a scanning portion of the head face for scanning respective tracks on said magnetic tape,
    a positioning system attaching said magnetic head to said head support for adjustably positioning the magnetic head relative to said magnetic tape, comprising a first positioning means including piezo-electric elements for moving the head position in a first direction relative to the magnetic tape; a second positioning means comprising piezo-electric elements for pivotally moving said magnetic head in a second direction relative to the magnetic tape about a pivotal axis extending substantially perpendicularly to a plane tangential to said scanning portion of the head face; and first and second control means for generating and applying respective control signals to the piezo-electric elements of the first and second positioning means, said control signals being representative of the difference between the instantaneous and the desired position of the magnetic head relative to the magnetic tape,
    characterized in that said first positioning means includes two piezo-electric elements disposed substantially parallel to each other and to said pivotal axis, on opposite sides of the pivotal axis, and arranged for moving the magnetic head in the width direction of the magnetic tape,
    said second positioning means includes at least three piezo-electric elements each having a longitudinal axis, regularly spaced around said pivotal axis with said longitudinal axes extending substantially parallel to said pivotal axis, and
    one of said positioning means is connected to the head support through the other positioning means.

2. An apparatus as claimed in claim 1, characterized in that the second positioning means comprises at least two pairs of piezo-electric elements, the two elements of each pair of piezo-electric elements being disposed diametrically opposite one another relative to the pivotal axis.

3. An apparatus as claimed in claim 1, characterized in that the piezo-electric elements of said first positioning means each have first and second ends, the first end being connected rigidly with respect to the magnetic head; the piezo-electric elements of said second positioning means each have first and second ends, the second ends being connected rigidly with respect to said head support; and the apparatus includes a deck-plate to which the head support is mounted.

4. An apparatus as claimed in claim 3, characterized in that the second positioning means includes first and second spaced supports on which the respective first and second ends of the second positioning means piezo-electric elements are arranged, the first support being rigidly connected to the first positioning means and the second support being rigidly connected to the head support.

5. An apparatus as claimed in claim 3, characterized in that the first positioning means includes a supporting element interconnecting the second ends of the piezo-electric elements of the first positioning means, said second ends being remote from the magnetic head; and that the magnetic head, supporting element and first and second piezo-electric elements of the first positioning means form a housing within which the second positioning means is arranged.

6. An apparatus as claimed in claim 5, characterized in that said second positioning means includes an arm extending from the head support into the housing, said second support being rigidly connected to an end of said arm remote from the head support.

7. An apparatus as claimed in claim 6, characterized in that said arm is concentric with the pivotal axis, the piezo-electric elements of the second positioning means being disposed around said arm.

8. An apparatus as claimed in claim 7, characterized in that said arm is constituted by a hollow tube, and in that the first control means comprises an optical measuring arrangement having two optical systems for sensing the respective magnetic edges of the magnetic tape, said optical systems each including an optical fiber, at least a portion of each of said fibers being arranged to pass through at least a portion of said tube.

9. An apparatus as claimed in claim 1, characterized in that the first control means comprises an optical measuring arrangement which includes two optical systems for sensing the respective edges of the magnetic tape, said optical systems being situated diametrically opposite one another relative to the pivotal axis.

* * * * *